April 30, 1935.  W. GOLDSMITH  1,999,452
SWAY CONTROL MACHINE
Filed Jan. 17, 1933   4 Sheets-Sheet 1
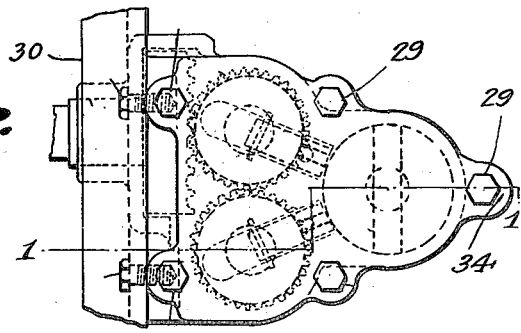
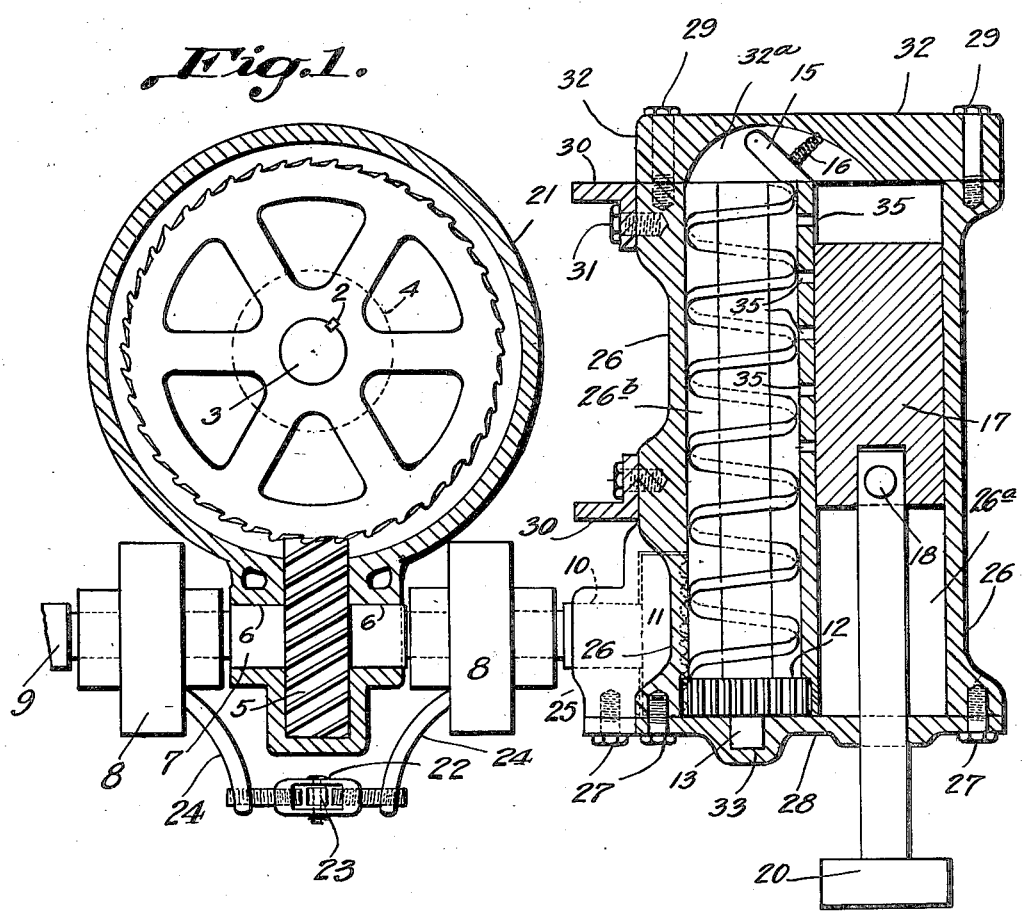
Inventor
William Goldsmith April 30, 1935.  W. GOLDSMITH  1,999,452
SWAY CONTROL MACHINE
Filed Jan. 17, 1933  4 Sheets-Sheet 2
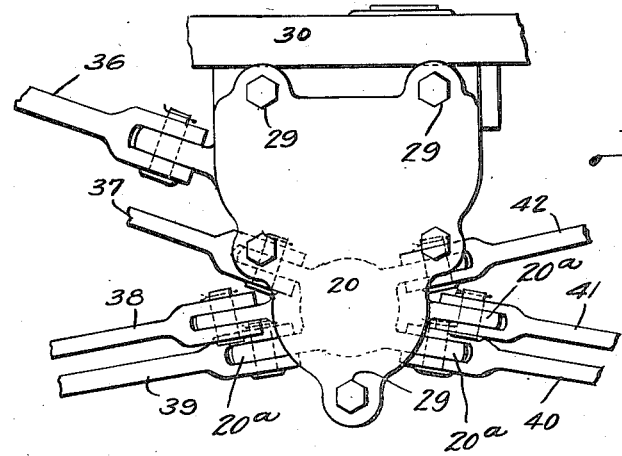
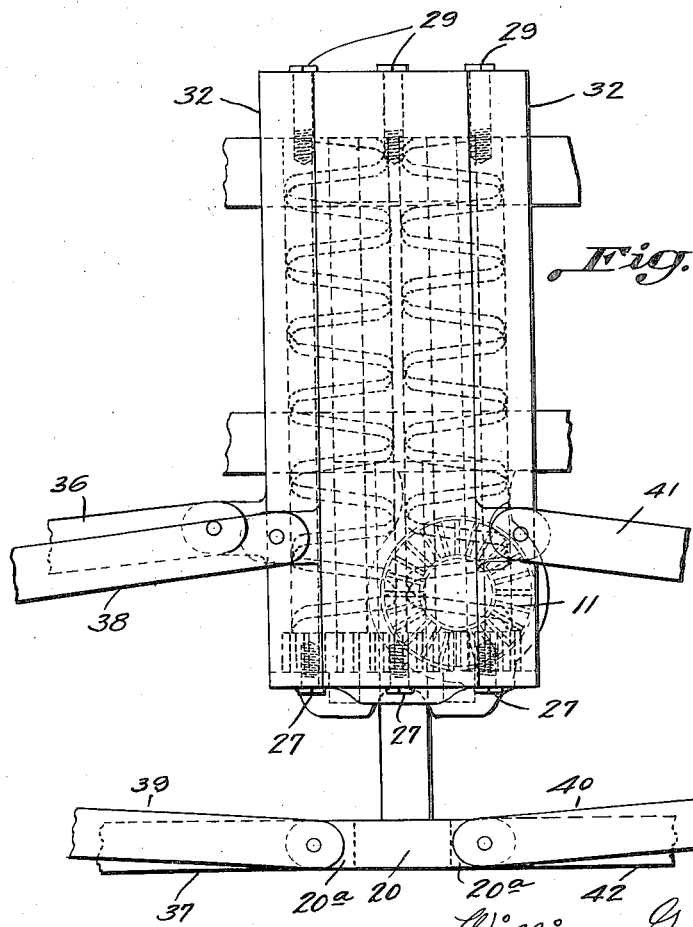
Inventor
William Goldsmith April 30, 1935. W. GOLDSMITH 1,999,452
SWAY CONTROL MACHINE
Filed Jan. 17, 1933 4 Sheets-Sheet 3
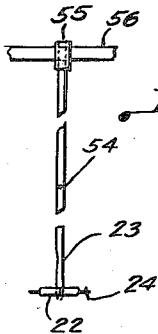
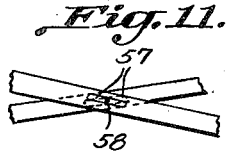
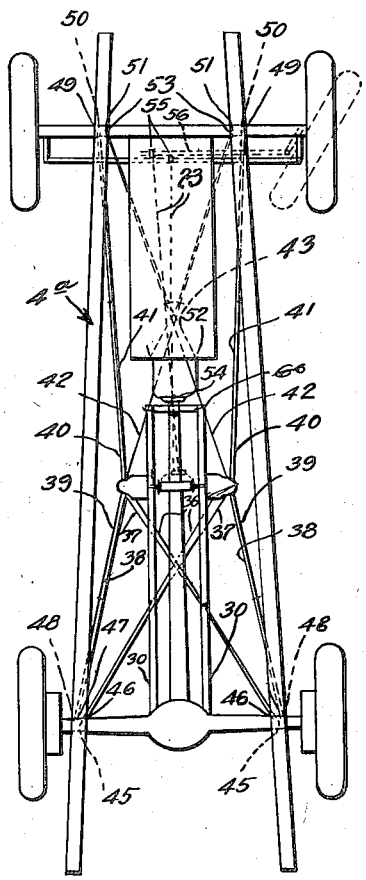
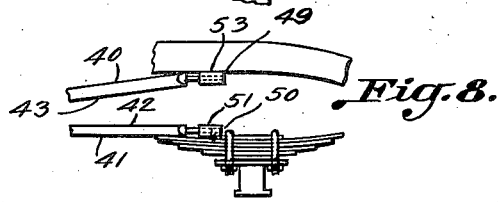
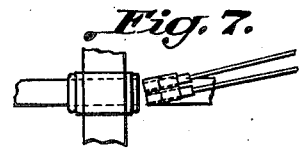
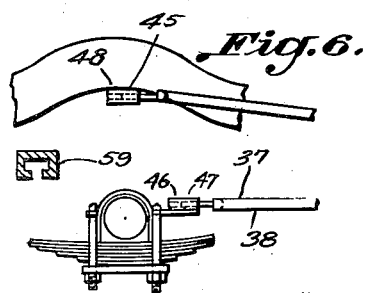

April 30, 1935.  W. GOLDSMITH  1,999,452
SWAY CONTROL MACHINE
Filed Jan. 17, 1933  4 Sheets-Sheet 4
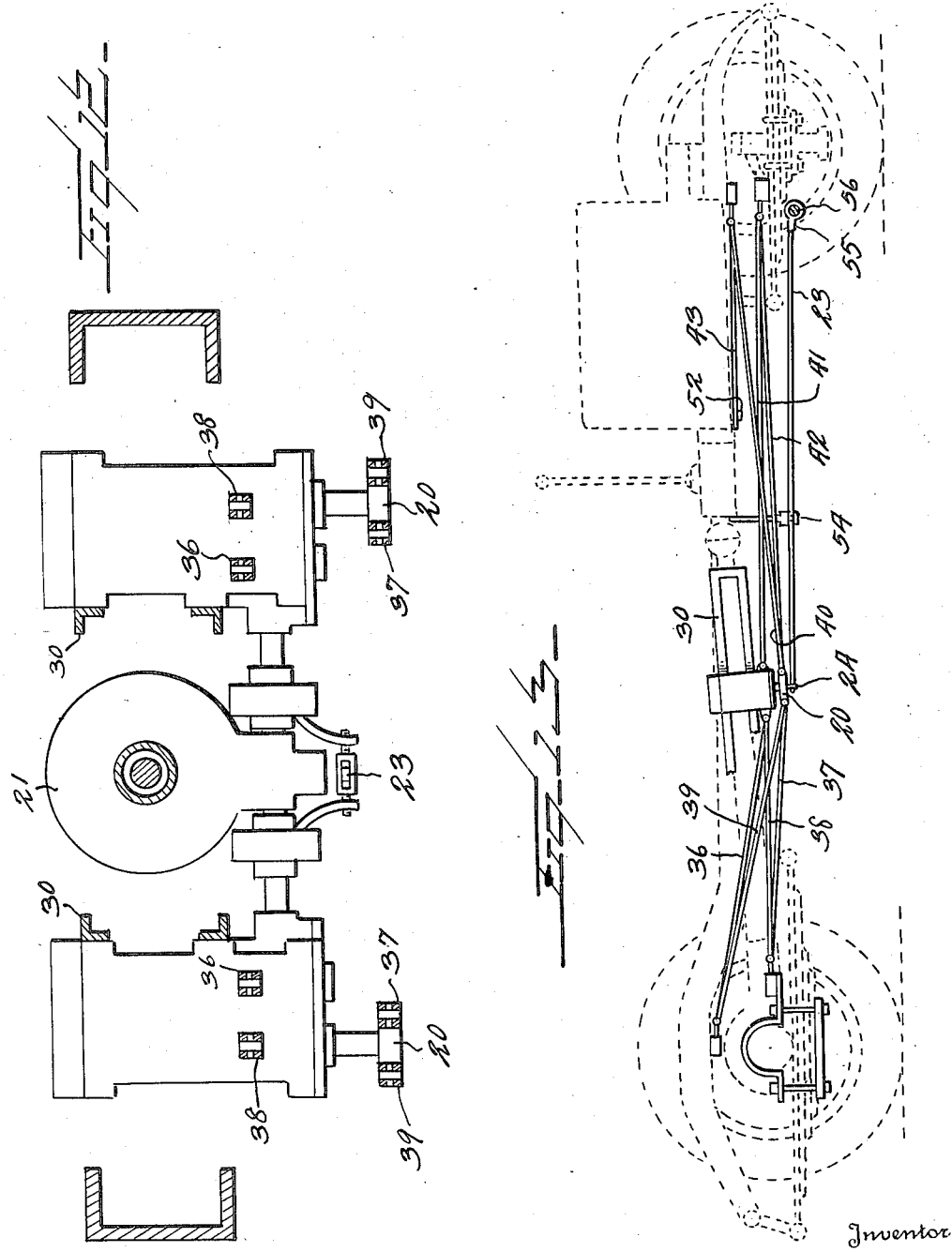
Inventor
W. Goldsmith
By Watson E. Coleman
Attorney Patented Apr. 30, 1935

1,999,452

UNITED STATES PATENT OFFICE 1,999,452

SWAY CONTROL MACHINE

William Goldsmith, Oakland, Calif.

Application January 17, 1933, Serial No. 652,192

9 Claims. (Cl. 280—87)

This invention relates to mechanism for controlling the body movements of a motor vehicle or other wheeled vehicle and pertains particularly to mechanism for controlling side sway of the body.

The primary object of the present invention is to provide a mechanism for use upon wheeled vehicles, by means of which forces are applied to the vehicle body and carrying or under structure when the vehicle is moving along a curved path, to counteract the tendency of the body to rise up upon the inner side of the curved path, or, in other words, to counteract the centrifugal force acting upon the vehicle.

A further object of the invention is to provide a novel mechanism of the above described character which is set into operation automatically with the action of the steering mechanism.

A still further object of the invention is to provide a sway controlling mechanism operating in the manner above described, by the positive application of power transmitted from the vehicle power plant to points on the body and supporting structure therefor remote from the power plant.

A still further object of the invention is to provide a sway control mechanism for a wheeled vehicle which comprises a series of connecting rods coupled with the vehicle body and chassis frame and connected with a mechanism carried beneath the body and operatively connected with the driving shaft of the vehicle power plant whereby movement of the rods may be effected simultaneously with the turning of the vehicle steering mechanism to effect the holding of the body against movement upon that side which would normally move or sway most through centrifugal action.

The invention will be best understood from a consideration of the following detailed description taken in connection with the accompanying drawings forming part of this specification with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in cross section through one of the control rod actuating units and the mechanism by which the same is coupled with the drive shaft of the vehicle upon which the device is mounted, the section through the control rod unit being taken on the line 1—1 of Figure 2.

Figure 2 is a view in top plan of one of the rod controlling units.

Figure 3 is a view in front elevation of a rod controlling unit.

Figure 4 is a view in top plan of a rod controlling unit showing the manner in which the control rods are joined thereto.

Figure 5 is a diagrammatic top plan view of a motor vehicle chassis illustrating the application of the control mechanism thereto.

Figure 6 is a detail view of a portion of a chassis and an underlying axle showing the method of connecting the control rods therewith.

Figure 7 is a view illustrating in top plan the connection of a pair of control rods with an axle.

Figure 8 is a detail view of a portion of a chassis frame and a front axle showing the method of connecting the control rods therewith.

Figure 9 is a view in top plan illustrating the manner in which the control rods are joined to the front axle.

Figure 10 is a diagrammatic view illustrating the connection of the vehicle steering mechanism with the sway control mechanism.

Figure 11 is a view illustrating one method of joining a pair of crossed control rods whereby the same are held together by permitted relative sliding movement.

Figure 12 is a view in cross section of a chassis frame and showing the rod actuating mechanism and operating means in elevation within the frame.

Figure 13 is a diagrammatic view illustrating the entire control mechanism in side elevation and its application to the vehicle frame, the latter being shown in dotted outline.

Referring now more particularly to the drawings wherein like numerals of reference designate corresponding parts throughout the several views, the numeral 1 illustrates a gear member which is secured by means of the key 2 to the drive shaft 3 of a motor vehicle, which shaft is enclosed in the usual housing 4.

Disposed beneath and in toothed connection with the gear 1 is a smaller gear 5, which is disposed to rotate about an axis extending transversely of the shaft 3, this gear having the hubs 7 which are rotatably mounted in the bearing portion 6 of the housing 21 which, as illustrated, also encases the gear 1.

At opposite sides of the gear 5 are laterally directed shafts 9 which are joined with the hubs 7 through the medium of the normally disengaged clutch structures 8. These clutch structures or units may be of any suitable type which remain disengaged and which are adapted to be engaged by the movement of a control lever which will be hereinafter more specifically referred to.

Extending longitudinally of the vehicle chassis frame which is indicated generally by the numeral 4a, are located upon either side of the drive shaft housing 4 the pair of supporting beams 30 which are disposed one above the other and which are connected at their forward ends with the housing 4 by cross connecting members 60 while at their rear ends, they are joined in any suitable manner to the differential housing of the rear axle of the machine.

Each pair of beams 30 supports at one side of the housing 21 a vertical housing 26 which forms a part of a rod actuating unit and which has secured to its underside by the bolts 27, a bottom plate 28 and to its top by bolts 29 a head plate 32. The housing 26 is joined to the beams 30 by tap screws 31 as illustrated in Figure 1.

The interior of each housing 26 is formed to provide a vertical piston chamber 26a and a pair of worm pump chambers 26b and the underface of the head 32 is provided with suitable passage recesses 32a to provide communication between the chambers 26b and the chamber 26a. In addition, the upper part of the wall separating these chambers is provided with a plurality of openings 35 for the purpose hereinafter described. Housed in the lower part of the wall of the housing 26 of each rod controlling unit is a gear 11 which is joined with the adjacent shaft 9, the latter being supported in the bearing 10. In each of the chambers 26b is mounted the vertical screw 14 which at its lower end has the terminal trunnion 13 which engages for rotation in the bearing 33 in the lower plate 28 of the housing and, in addition, a gear 12 is carried at the lower end of the screw, as illustrated in Figure 1.

The gears 12 of the adjacent screws of each rod controlling unit are joined for simultaneous rotation as illustrated in Figure 2, and one thereof is joined to the adjacent gear 11 to be driven thereby.

In each of the passages 32a is a flap valve 15 which is arranged to open in the direction of the chamber 26a and which is normally held closed by a spring 16. The chambers 26b are normally filled with oil or some other suitable fluid and upon the rotation of the worms 14, this oil is forced from the top of the worm chambers past the valves 15 and by means of the passages 32 into the upper part of the adjacent piston chamber 26a. In the piston chamber 26a of each unit is a piston 17 which is connected by the pin 18 with a rod 19 which passes downwardly through the bottom plate 28 to the exterior of the unit and terminates in the head 20. The forcing of the fluid into the chamber 26a will thus operate to force this piston downwardly and as the piston passes the openings 35 which it normally covers, the fluid will also enter the piston chamber by these passages.

The normally disengaged clutches 8 are each controlled by means of a lever arm 24 and these arms are joined together by the screw and turnbuckle connection 22. Pivotally joined to the turnbuckle 22 is one end of a lever 23 which extends forwardly beneath the motor vehicle 2 and is connected at its forward end with the steering gear tie rod 56 at the point 55. Intermediate its ends, this lever 23 is pivotally joined, as at 54, to an adjacent overlying portion of the vehicle so that upon the operation of the steering mechanism and the movement of the tie rod in one direction, the opposite or remote end of the lever 23 will be shifted in the opposite direction so as to effect the engagement of one of the clutch units 8 and consequently, the coupling of the rotating drive shaft 3 with one of the rod controlling units.

Each of the piston heads 20 has formed integral therewith four ears 20a, two being directed toward the front of the machine and two toward the rear. To the forwardly directing ears of each head are connected the ends of rods 40 and 42, each rod 40 being joined to the chassis frame upon the side of the machine where the head to which it is connected is located while each rod 42 extends from its head 20 forwardly to the opposite side of the machine where it is joined to the front axle as indicated by numeral 51. The connection of the rods 40 with the frame is made at the points 49.

To the rearwardly directed ears of each head 20 are joined the ends of rods 37 and 39, the rods 37 extending across the machine to the opposite side from the heads to which they are attached to connect with the rear axle at the points 46, while the rods 39 extend to the rear of the machine upon the same side as the heads to which they are joined to connect with the frame at points 48.

To the forward side of each housing 26, there is connected one end of a rod 41 which extends forwardly on the same side of the machine to connect with the front axle at the point 50 and to the rear of each of these housings 26 are connected two rods 36 and 38, the rod 36 crossing over to the opposite side of the machine from the housing to which it is attached to connect with the frame or chassis at the points 45 and the rods 38 extending rearwardly on the same side of the chassis as the housings to which they are attached to connect with the rear axle at the points 47.

In addition to the foregoing, two rods 43 are joined to the chassis frame at the front at 53, and extend rearwardly in crossed relation to attach to the oil pan at the points 52.

Figure 11 illustrates a connection which may be employed between two rod members where the same are in crossed relation, whereby relative longitudinal movement of the rod is permitted while at the same time preventing relative up and down movement which would result in the creation of noise.

As will be seen upon reference to Figures 6 to 9 inclusive, the connection between the ends of the rods and the front and rear springs and front and rear portions of the chassis frame to which they extend are of a character to permit slight relative movement between the rods and the parts of the chassis frame to which they are connected. These connections are indicated generally in the figures referred to by the numerals 45 to 51 inclusive, and it will be apparent upon reference to these figures that the connections comprise the formation of reduced end portions 50a upon each of the rods which extend into cylindrical receiving sleeves or bodies 50b, the latter being secured to the axle, spring or frame, as the case may be. The movement of the reduced ends 50a of the rods in the sleeve 50b is limited so that the said reduced ends cannot pull out of the sleeves when the pistons to which the rods are connected are actuated in the operation of the mechanism. In order that the reduced ends of the rods may operate freely in the sleeves, since the latter are rigidly secured, the said reduced ends may be pivotally joined to the rods at 50c so that relative movement between the rods and their reduced end portions may take place.

In the operation of the present mechanism, should the operator of the motor vehicle turn the steering mechanism to guide the car into a curve bearing to the right, the forward end of the rod 23 will be swung toward the left side of the machine with a consequent swinging of the opposite or rear end of this rod to the right or in the opposite direction. This will move the rear end of the rod in a direction to shift the arm 24 upon the left hand side of the car and allow the clutch 8 adjacent thereto to engage and thus couple the drive shaft of the machine with the shaft 9 leading to the mechanism upon the left side of the car. The piston in the cylinder at the left side of the car will then be driven downwardly and because of its connection with the front and rear of the chassis through the medium of the rods 37, 39, 40 and 42, and the connection of the fixed housing for the piston with the front and rear portions of the chassis through the medium of the rods 36, 38 and 41, the body of the car upon the left or outside of the curve on which the car is moving will be forced upwardly or lifted so as to counteract the tendency of the inner side of the car to rise. Turning the vehicle in the opposite direction will, of course, produce exactly the opposite results through the connection of the piston and the associated mechanism upon the right side of the vehicle, with the vehicle drive shaft.

I claim:

1. Sway control mechanism for wheeled vehicles having a chassis, wheel supported axles, a drive shaft and steering gear tie rod, comprising a pair of power units each including a fluid actuated piston, mechanism coupled with said drive shaft for impressing fluid pressure against said pistons, said pistons being movable in a vertical path, means connecting said mechanism with said tie rod whereby one of said pair of pistons will be caused to move in accordance with the direction of movement of the tie rod, and control rods coupling said pistons with the front and rear axles and the chassis frame at the front and rear of the vehicle.

2. Sway control means for a motor vehicle having a wheeled chassis frame, steering means therefor, a body mounted thereon and a drive shaft, comprising a gear mechanism permanently coupled with the drive shaft, a pair of units disposed with said gear mechanism therebetween, each of said units comprising a vertically movable piston, a fluid pump and fluid adapted to be forced by the pump against the piston, an operating shaft connected with each unit pump, a normally disengaged clutch connected between each operating shaft and said gear mechanism, mechanism coupling said clutches with the steering gear of the vehicle whereby the movement of the steering gear in one direction will effect the engagement of one clutch, and control rods connected with each of said pistons and joining the same with the vehicle running gear at the front and rear of the latter.

3. Sway control means for a motor vehicle having a wheel supported chassis designed to support a body, axles connecting the wheels and coupled with the chassis, a drive shaft and a steering mechanism controlling the wheels, comprising a gear train normally coupled with the driving shaft, a unit mounted at each side of said gear train each including a housing having a piston chamber, a piston therein, a pump chamber communicating with the piston chamber, a pump element in the pump chamber, means for transmitting driving power to the pump means, a connecting rod joined to the piston of each unit, a normally disengaged clutch element interposed between said gear train and the means for transmitting power to the pump, operating levers for said clutch units, a pivotally mounted lever having one end connected with said clutch unit operating levers and having its other end coupled with the steering mechanism whereby movement of the steering mechanism in either direction will effect the engaging of a clutch unit, rod members connected with and extending forwardly and rearwardly from each of said first mentioned units and forming connecting means with the axles and chassis frame, and a plurality of rods connected with and extending forwardly and rearwardly from each of said piston rods and connecting the same with the chassis frame at the front and rear thereof and with the front and rear axles.

4. Sway control means for a vehicle having a running gear including a frame for the support of a body, wheels and spring connections between the wheels and the frame, power driving means and steering mechanism, comprising a pair of elements mounted to move in a straight vertical path, means for selectively coupling said elements with the power means for movement thereby, means coupling the steering mechanism with said selective coupling means whereby the actuation of the steering mechanism will actuate the selective coupling means, and rods connected with each movable element and connected with and transmitting motion to the running gear from the said element.

5. Sway control means for a vehicle having a running gear including a frame for the support of a body, wheels and spring connections between the wheels and the frame, power driving means and steering mechanism, comprising a pair of elements mounted to move in a straight vertical path, means for selectively coupling said elements with the power means for movement thereby, means coupling the steering mechanism with said selective coupling means whereby the actuation of the steering mechanism will actuate the selective coupling means, and a plurality of rods connected with each movable element and extending therefrom to the front and rear of the frame, certain of the front and rear extending rods being joined to the frame and the others being joined to the connection between the wheels and the frame, said rods constituting the sole means of transmitting the motion of the movable elements to the frame.

6. Sway control means for a vehicle having a running gear including a frame for the support of a body, wheels and spring connections between the wheels and the frame, power driving means and steering mechanism, comprising a pair of elements mounted to move in a straight vertical path, means for selectively coupling said elements with the power driving means including a pair of clutch units which are disengaged when the vehicle is traveling along a straight path, means for engaging a clutch unit automatically with the steering of the vehicle in a curved path, and rod members coupling the vertically movable elements with the frame for restraining the swaying of the latter through the movement of the vertically movable elements connected with the rods.

7. Sway control means for a motor vehicle having a wheeled chassis frame, steering means therefor and a drive shaft, the chassis frame being designed to carry a body, comprising an element carried by the drive shaft to be constantly rotated therewith, a driven member mounted upon each side of the drive shaft for movement in a vertical path, normally disengaged clutch means associated with each driven element for operatively coupling the same with the drive shaft carried element, a connection between said clutch means and the steering means for the vehicle whereby the steering of the vehicle in a curved path will effect the engagement of a clutch means associated with one element, and a plurality of rods connected with each vertically movable element and extending to the front and rear of the vehicle and connecting the element with the vehicle chassis, said rods constituting the sole means of transmitting the motion of the movable elements to the frame.

8. Sway control mechanism for vehicles having a running gear, power mechanism, a body mounted on the running gear and steering mechanism, comprising a pair of units disposed beneath the body and each including a vertically movable piston, and means for applying fluid pressure thereto, gear mechanism for selectively coupling the pressure applying means of said unit pistons with the vehicle power mechanism, means coupling said pistons with the running gear of the vehicle at the front and rear of the latter, and means for actuating the selective gear coupling mechanism by the vehicle steering mechanism.

9. Sway control mechanism for a vehicle having a running gear, a body carried thereby, a drive shaft and steering means, comprising a pair of units, each comprising a fixed part and a vertically movable element, means operated by and simultaneously with the actuation of said steering mechanism to guide the vehicle into a curve, for operatively coupling said drive shaft with one only of said units for the actuation of the movable element thereof, and rod members connecting the fixed part and the movable element of each of said units with the front and rear of the vehicle running gear and the structure supported thereby and operating when the vertically movable element connected therewith is shifted to transmit motion from the said element to effect the lifting of the said body upon the adjacent side.

WILLIAM GOLDSMITH.